United States Patent
Yu et al.

(10) Patent No.: US 10,977,362 B2
(45) Date of Patent: Apr. 13, 2021

(54) PROGRAM EXECUTION AND DATA PROOF SCHEME USING MULTIPLE KEY PAIR SIGNATURES

(71) Applicant: Advanced New Technologies Co., Ltd., Grand Cayman (KY)

(72) Inventors: Yirong Yu, Hangzhou (CN); Honglin Qiu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/933,629

(22) Filed: Jul. 20, 2020

(65) Prior Publication Data

US 2020/0349252 A1    Nov. 5, 2020

Related U.S. Application Data

(63) Continuation of application No. 16/588,436, filed on Sep. 30, 2019, now Pat. No. 10,762,197, which is a
(Continued)

(51) Int. Cl.
*G06F 21/53*       (2013.01)
*G06F 21/60*       (2013.01)
(Continued)

(52) U.S. Cl.
CPC .......... *G06F 21/53* (2013.01); *G06F 21/602* (2013.01); *H04L 9/006* (2013.01); *H04L 9/3247* (2013.01)

(58) Field of Classification Search
CPC ..... G06F 21/53; G06F 21/602; H04L 9/3247; H04L 9/006
See application file for complete search history.

(56) References Cited

U.S. PATENT DOCUMENTS 9,722,775 B2    8/2017 Hjelm et al.
10,097,350 B2   10/2018 Smith et al.
(Continued)

FOREIGN PATENT DOCUMENTS

CN     104899506    9/2015
CN     107003889    8/2017
(Continued)

OTHER PUBLICATIONS

Boneh et al., "Compact Multi-Signatures for Smaller Blockchains", Stanford University, Retrieved From https://eprint.iacr.org/2018/483.pdf, Published May 23, 2018. (Year: 2018).*

(Continued)

*Primary Examiner* — Chau Le
(74) *Attorney, Agent, or Firm* — Fish & Richardson P.C.

(57) ABSTRACT

Methods, systems, and apparatus, including computer programs encoded on computer storage media for program execution and data proof scheme to prove that sub-logic code that was expected to be executed within a TEE was indeed executed, and that the resulting data is trustworthy. In some implementations, each sub-logic code of a plurality of sub-logic code is registered, and stored within the TEE, and a key pair (private key, public key) corresponding to the sub-logic code is generated. The client receives and stores the public key, sends requests to the TEE with an identifier of the sub-logic that is to be executed. The sub-logic code corresponding to the identifier is executed within the TEE, which signs the result using a digital signature that is generated using the private key of the sub-logic code. The client verifies the result based on the digital signature and the public key of the sub-logic code.

18 Claims, 8 Drawing Sheets

Related U.S. Application Data continuation of application No. PCT/CN2019/079715, filed on Mar. 26, 2019.

(51) Int. Cl.
*H04L 9/00* (2006.01)
*H04L 9/32* (2006.01)

(56) References Cited

U.S. PATENT DOCUMENTS

| | | |
|---|---|---|
| 10,762,197 B1 | 9/2020 | Yu et al. |
| 2015/0033316 A1 | 1/2015 | Scarlata et al. |
| 2016/0191246 A1 | 6/2016 | Varadaranjan et al. |
| 2016/0254904 A1* | 9/2016 | Hjelm .................... H04L 9/006 713/155 |
| 2018/0212932 A1 | 7/2018 | Novak |
| 2018/0239897 A1 | 8/2018 | Ventura |
| 2018/0254898 A1 | 9/2018 | Sprague et al. |
| 2018/0287802 A1 | 10/2018 | Brickell |
| 2018/0309567 A1 | 10/2018 | Wooden |
| 2019/0097790 A1* | 3/2019 | Li .......................... H04L 9/085 |

FOREIGN PATENT DOCUMENTS

| | | |
|---|---|---|
| CN | 108563953 | 9/2018 |
| CN | 105339945 | 1/2019 |
| TW | 201842463 | 12/2018 |
| WO | WO 2016105651 | 6/2016 |
| WO | WO 2018140170 | 8/2018 |
| WO | WO 2018189658 | 10/2018 |
| WO | WO 201910863 | 1/2019 |
| WO | WO 2019016641 | 1/2019 |

OTHER PUBLICATIONS

Cheng et al., "Ekiden: A Platform for Confidentiality-Preserving, Trustworthy, and Performant Smart Contract Execution", Cornell University, Apr. 2018, 20 pages.

Crosby et al., "BlockChain Technology: Beyond Bitcoin," Sutardja Center for Entrepreneurship & Technology Technical Report, Oct. 16, 2015, 35 pages.

Extended European Search Report in European Application No. 19732227.4, dated Jun. 9, 2020, 8 pages.

International Search Report and Written Opinion in International Application No. PCT/CN2019/079715, dated Jan. 2, 2020, 6 pages.

Nakamoto, "Bitcoin: A Peer-to-Peer Electronic Cash System," www.bitcoin.org, 2005, 9 pages.

Pei et al., ietf.org [Online], "Trusted Executions Environmnet Provisioning (TEEP) Architecture draft-ietf-teep-architecture-02," Mar. 2019, [Retrieved on Jan. 29, 2020], retrieved from: URL<https://tools.ietf.org/html/draft-ietf-teep-architecture-02>, 38 pages.

Software.intel.com [online]. "Enhanced Security Features for Applications and Data In-use," 2019, retrieved on Nov. 26, 2019, retrieved from URL<https://software.intel.com/sites/default/files/managed/c3/8b/intel-sgx-product-brief-2019.pdf>, 4 pages.

Software.intel.com [online], "Inter Software Guard Extensions," retrieved on Nov. 26, 2019, retrieved from URL<https://software.intel.com/en-us/sgx>, 5 pages.

Wikipedia [online], "Trusted execution environment," retrieved on Nov. 26, 2019, retrieved from URL< https://en.wikipedia.org/wiki/Trusted_execution_environment>, 6 pages.

Zhang et al., "Town Crier: An Authenticated Data Feed for Smart Contracts", International Association for Crytologic Research, Jun. 2016, 20 pages.

\* cited by examiner

US 10,977,362 B2

PROGRAM EXECUTION AND DATA PROOF SCHEME USING MULTIPLE KEY PAIR SIGNATURES

CROSS-REFERENCE TO RELATED APPLICATIONS

This application is a continuation of U.S. patent application Ser. No. 16/588,436, filed Sep. 30, 2019, which is a continuation of PCT Application No. PCT/CN2019/079715, filed on Mar. 26, 2019, each application is hereby incorporated by reference in its entirety.

TECHNICAL FIELD

This specification relates to program execution and data proof for programs executing within trusted execution environments (TEEs).

BACKGROUND

Distributed ledger systems (DLSs), which can also be referred to as consensus networks, and/or blockchain networks, enable participating entities to securely and immutably store data. DLSs are commonly referred to as blockchain networks without referencing any particular use case. An example type of blockchain network can include consortium blockchain networks provided for a select group of entities, which control the consensus process, and includes an access control layer.

A so-called trusted execution environment (TEE) is a trusted environment within hardware (one or more processors, memory) that is isolated from the hardware's operating environment. A TEE is a separate, secure area of a processor that ensures the confidentiality, and integrity of code executing, and data loaded within, or provided from the main processor. However, prior to execution of the code, an attestation process is performed to verify (prove) that the TEE is operating as expected, and is executing the code that is expected to be executed therein.

In some instances, the code executing in the TEE executes stateful sub-logic. That is, different sub-logic can be executed within the TEE depending on respective states. Accordingly, when a client makes a call to the program executing within the TEE, the call includes request parameters, the sub-logic code and the state data of the sub-logic code. The program executing in the TEE loads the sub-logic code and state data, and executes the sub-logic based on the request parameters to provide a result to the client. However, only the static code and static data of the program are measured and remotely verified in the attestation process. Consequently, the program executing in the TEE needs to provide proof that the expected sub-logic was executed, and that the returned result is trustworthy.

Although techniques have been proposed for program execution and data proof for programs executing within TEEs, a more effective solution to address the security and resource consumption issues would be advantageous.

SUMMARY

This specification describes technologies for program execution and data proof for programs executing within trusted execution environments (TEEs).

In general, innovative aspects of the subject matter described in this specification are directed to a program execution and data proof scheme to prove that sub-logic code that was expected to be executed within a TEE was indeed executed, and that the resulting data is trustworthy. In some implementations, each sub-logic code of a plurality of sub-logic code is registered, and stored within the TEE, and a key pair (private key, public key) corresponding to the sub-logic code is generated. The client receives and stores the public key. When the client sends a request to the program executing within the TEE, the request includes an identifier of the sub-logic that is to be executed. The TEE retrieves the stored sub-logic corresponding to the identifier, executes the sub-logic code, and provides a result. The TEE signs the result using a digital signature that is generated using the private key of the sub-logic code. The client receives the result, and verifies the result based on the digital signature and the public key of the sub-logic code.

The subject matter described in this specification as provided in particular implementations realizes one or more of the following technical advantages. For example, only the identifier of the sub-logic code that is to be executed is sent in the request from the client, instead of the sub-logic code itself. This significantly reduces the size of the request, which conserves computing resources (e.g., processors, memory, network bandwidth), and alleviates network bottlenecks. Further, in response to receiving the request, the trusted program need not parse and load the sub-logic code carried in the request, avoiding increased processing. As another example, after each request is processed, the trusted program only signs the result, and not the entire sub-logic code, and the client only checks the signed result. Both of these activities result in reduced processing relative to traditional approaches. Further, implementations of this specification improve scalability of use of sub-logic code, and variations thereof, by trusted programs.

This specification also provides one or more non-transitory computer-readable storage media coupled to one or more processors and having instructions stored thereon which, when executed by the one or more processors, cause the one or more processors to perform operations in accordance with implementations of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more implementations of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
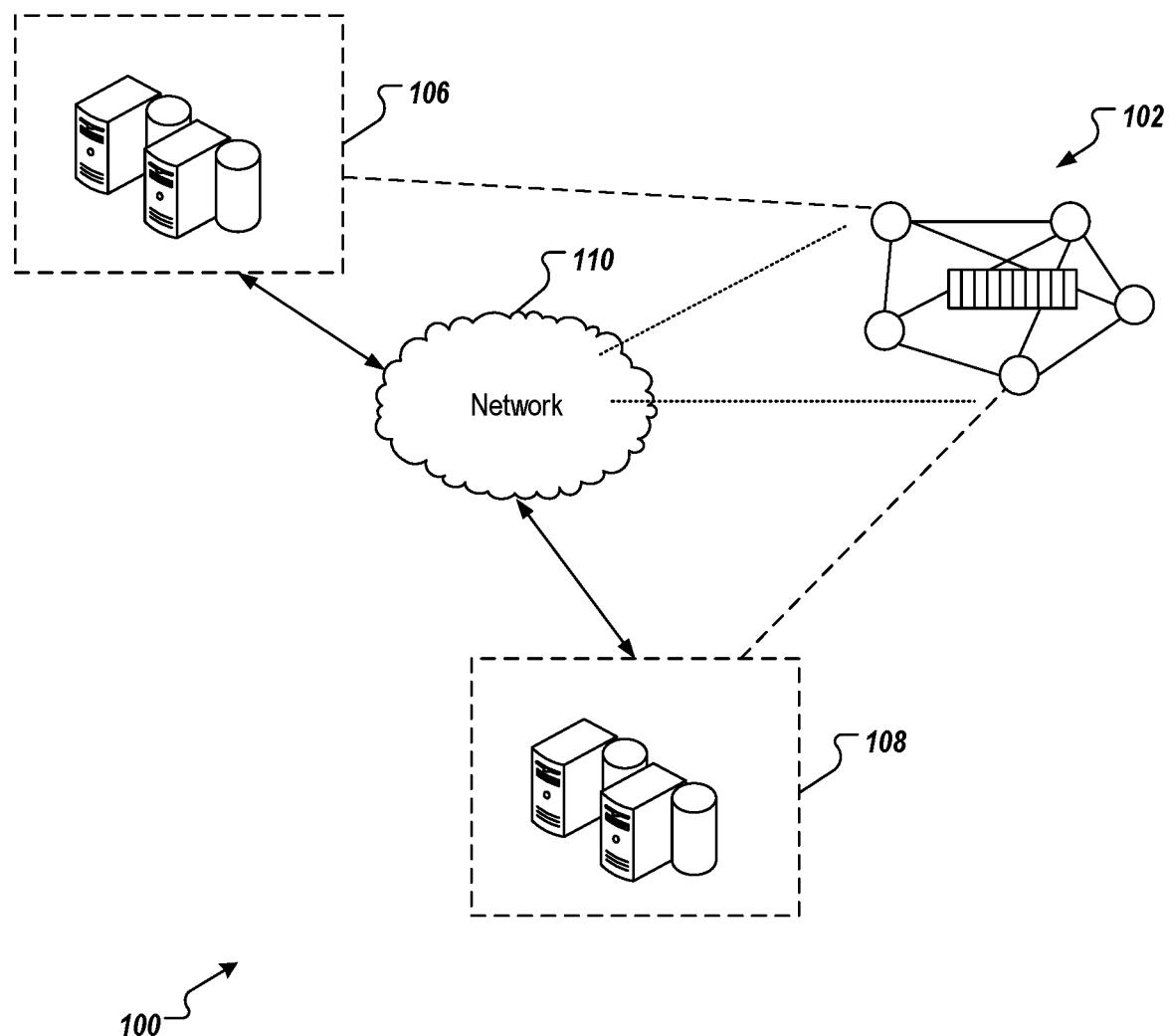
FIG. 1 is a diagram illustrating an example of an environment that can be used to execute implementations of this specification.

This specification describes technologies for program execution and data proof for programs executing within trusted execution environments (TEEs). More particularly, and as described in further detail herein, implementations of this specification are directed to a program execution and data proof scheme to prove that sub-logic code that was expected to be executed within a TEE was indeed executed, and that the resulting data is trustworthy. In some implementations, each sub-logic code of a plurality of sub-logic code is registered, and stored within the TEE, and a key pair (private key, public key) corresponding to the sub-logic code is generated. The client receives and stores the public key. When the client sends a request to the program executing within the TEE, the request includes an identifier of the sub-logic that is to be executed. The TEE retrieves the stored sub-logic corresponding to the identifier, executes the sub-logic code, and provides a result. The TEE signs the result using a digital signature that is generated using the private key of the sub-logic code. The client receives the result, and verifies the result based on the digital signature and the public key of the sub-logic code. In accordance with implementations of the present disclosure, only the identifier of the sub-logic code that is to be executed is sent in the request from the client, instead of the sub-logic code itself. This significantly reduces the size of the request, which conserves computing resources (e.g., processors, memory, network bandwidth), and alleviates network bottlenecks.

To provide further context for implementations of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Implementations of this specification are described in further detail herein with reference to a consortium blockchain network. It is contemplated, however, that implementations of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute implementations of this specification. In some examples, the example environment 100 enables entities to participate in a consortium blockchain network 102. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
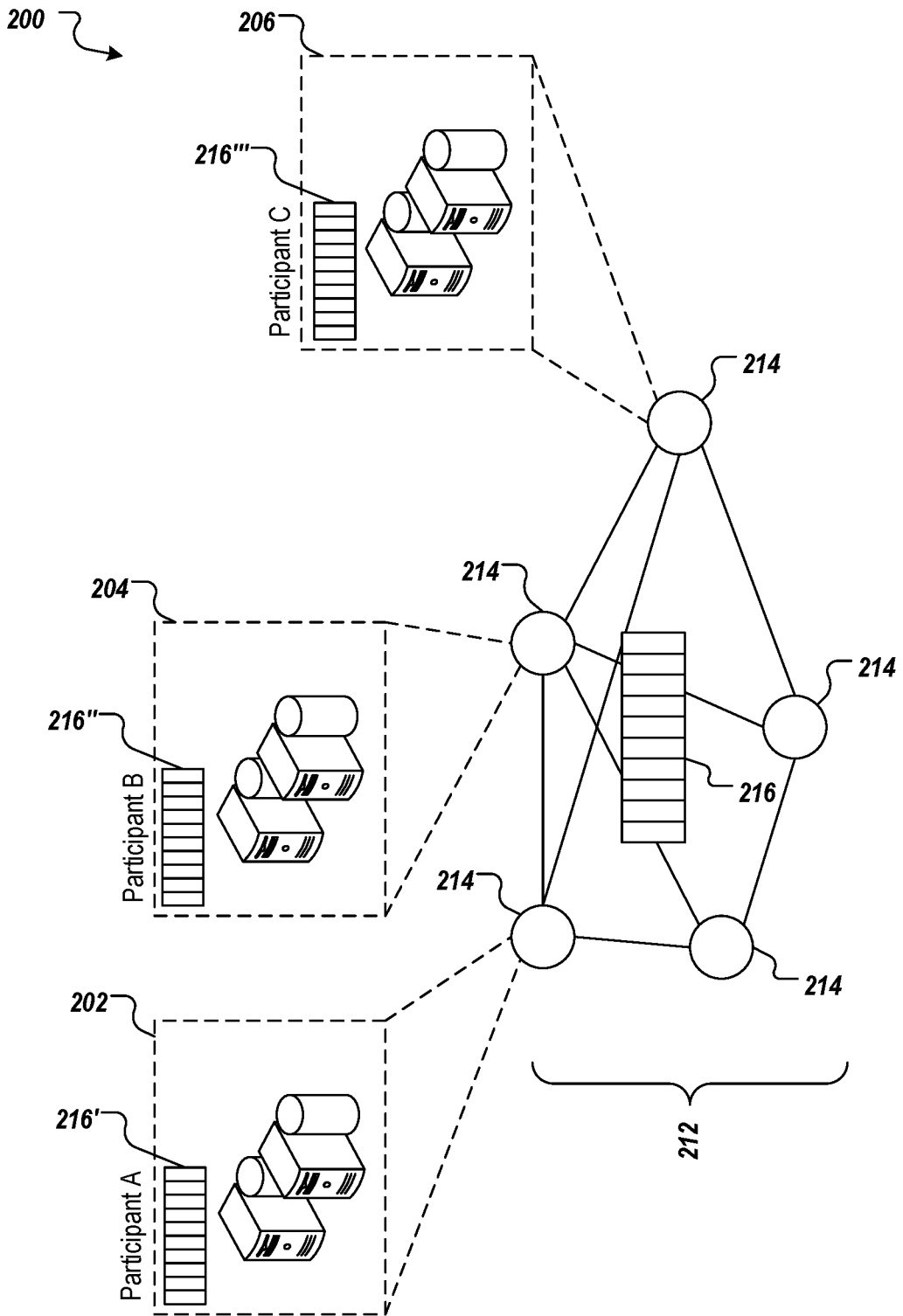
FIG. 2 is a diagram illustrating an example of a conceptual architecture in accordance with implementations of this specification.

FIG. 2 depicts an example of a conceptual architecture 200 in accordance with implementations of this specification. The conceptual architecture 200 includes an entity layer 202, a hosted services layer 204, and a blockchain network layer 206. In the depicted example, the entity layer 202 includes three participants, Participant A, Participant B, and Participant C, each participant having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the consortium blockchain network.

A blockchain (e.g., the blockchain 216 of FIG. 2) is made up of a chain of blocks, each block storing data. Example data includes transaction data representative of a transaction between two or more participants. While transactions are used herein by way of non-limiting example, it is contemplated that any appropriate data can be stored in a blockchain (e.g., documents, images, videos, audio). Example transactions can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. Example cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some implementations, nodes of the blockchain network, and/or nodes that communicate with the blockchain network can operate using TEEs. At a high-level, a TEE is a trusted environment within hardware (one or more processors, memory) that is isolated from the hardware's operating environment (e.g., operating system (OS), basic input/output system (BIOS)). In further detail, a TEE is a separate, secure area of a processor that ensures the confidentiality, and integrity of code executing, and data loaded within the main processor. Within a processor, the TEE runs in parallel with the OS. At least portions of so-called trusted applications (TAs) execute within the TEE, and have access to the processor and memory. Through the TEE, the TAs are protected from other applications running in the main OS. Further, the TEE cryptographically isolates TAs from one another inside the TEE.

An example of a TEE includes Software Guard Extensions (SGX) provided by Intel Corporation of Santa Clara, Calif., United States. Although SGX is discussed herein by way of example, it is contemplated that implementations of this specification can be realized using any appropriate TEE.

SGX provides a hardware-based TEE. In SGX, the trusted hardware is the die of the central processing until (CPU), and a portion of physical memory is isolated to protect select code and data. The isolated portions of memory are referred to as enclaves. More particularly, an enclave is provided as an enclave page cache (EPC) in memory and is mapped to an application address space. The memory (e.g., DRAM) includes a preserved random memory (PRM) for SGX. The PRM is a continuous memory space in the lowest BIOS level and cannot be accessed by any software. Each EPC is a memory set (e.g., 4 KB) that is allocated by an OS to load application data and code in the PRM. EPC metadata (EPCM) is the entry address for respective EPCs and ensures that each EPC can only be shared by one enclave. That is, a single enclave can use multiple EPCs, while an EPC is dedicated to a single enclave.

During execution of a TA, the processor operates in a so-called enclave mode when accessing data stored in an enclave. Operation in the enclave mode enforces an extra hardware check to each memory access. In SGX, a TA is compiled to a trusted portion, and an untrusted portion. The trusted portion is inaccessible by, for example, OS, BIOS, privileged system code, virtual machine manager (VMM), system management mode (SMM), and the like. In operation, the TA runs and creates an enclave within the PRM of the memory. A trusted function executed by the trusted portion within the enclave is called by the untrusted portion, and code executing within the enclave sees the data as plaintext data (unencrypted), and external access to the data is denied. The trusted portion provides an encrypted response to the call, and the TA continues to execute.

An attestation process can be performed to verify that expected code (e.g., the trusted portion of the TA) is securely executing within the SGX-provided TEE. In general, the attestation process includes a TA receiving an attestation request from a challenger (e.g., another node in the blockchain network, a key management system (KMS) of the blockchain network). In response, the TA requests that its enclave produce a remote-attestation, also referred to as a quote. Producing the remote-attestation includes a local-attestation being sent from the enclave to a so-called quoting enclave, which verifies the local-attestation, and converts the local-attestation into the remote-attestation by signing the local-attestation using an asymmetric attestation key. The remote-attestation (quote) is provided to the challenger (e.g., client or KMS of the blockchain network).

The challenger uses an attestation verification service to verify the remote-attestation. For SGX, Intel provides the Intel Attestation Service (IAS), which receives the remote-attestation from the challenger, and verifies the remote-attestation. More particularly, the IAS processes the remote-attestation, and provides a report (e.g., attestation verification report (AVR)), which indicates whether the remote-attestation is verified. If not verified, an error can be indicated. If verified (the expected code is securely executing in the TEE), the challenger can start, or continue interactions with the TA. For example, in response to the verification, the KMS (as challenger) can issue asymmetric encryption keys (e.g., a public-key and private-key pair) to the node executing the TEE (e.g., through a key exchange process, such as elliptical curve Diffie-Hellman (ECDH)) to enable the node to securely communicate with other nodes, and/or clients.

As introduced above, in a TEE provided using SGX, at least a portion of code (e.g., trusted portion of a TA) is executed within an enclave, which code can be referred to as an enclave program. As also introduced above, an attestation process (remote authentication) is performed prior to execution of the enclave program. That is, the enclave and code are measured to provide a quote, which is used in the remote attestation to verify that the code is executing as expected within the enclave. Generally, only the code and data of the enclave program itself are measured in the attestation, and a hash of the measurement is carried in the quote and authenticated by the remote attestation service (e.g., IAS).

In further detail, the remote attestation process (also referred to as remote verification) uses asymmetric cryptography, and a quoting enclave (QE), which is specifically provisioned for remote attestation. The QE uses a device-specific, private asymmetric key (provisioned with the hardware) to digitally sign quotes. To further enhance security, the attestation uses an extension to a Direct Anonymous Attestation (DAA) scheme, which is known as Enhanced Privacy ID (EPID). EPID can be described as a group signature scheme that enables a platform to digitally sign data objects (e.g., quotes) without uniquely identifying the platform or linking different signatures. The QE generates the EPID key used for signing platform attestations. The EPID key is certified by an EPID backend infrastructure, and represents both the platform, and the trustworthiness of the underlying hardware. Only the QE has access to the EPID key, which is bound to the version of the processor's firmware. Consequently, a quote that is signed using the EPID key can be considered to be issued by the processor itself.

To begin the attestation process, the client issues a challenge to the TA to demonstrate that the TA is executing expected code inside the enclave. The TA is provided with the enclave identity of the QE (QEID). The QEID and the client's challenge are sent to the enclave. The enclave generates a manifest that includes a response to the challenge and a public key that can be used by the client for securely communicating with the enclave. The public key is ephemerally generated as part of the attestation process. The enclave generates a hash of the manifest and includes the hash for generation of a report that binds the manifest to the enclave. The enclave sends the report to the application, which provides the report to the QE to be signed. The QE creates the quote, signs the quote with its EPID key, and returns the signed quote to the TA. The TA sends the quote to the client, which had initiated the challenge.

The client provides the quote to the remote attestation service for authentication. For example, the IAS exposes an attestation application programming interface (API) to verify attestation evidence (e.g., quotes) of SGX-enabled enclaves. The attestation API is a Representational State Transfer (REST) API, and uses JavaScript Object Notation (JSON) as a data serialization format. The client submits a request to the IAS, through the attestation API, the request including an attestation evidence payload (AEP). The AEP includes the quote, which is provided in an isvEnclaveQuote field. The IAS processes the quote to verify the identity of the enclave and the validity of the platform within which the enclave is executed. More particularly, the IAS provides an AVR as a cryptographically signed report of verification of the identity of the enclave and the Trusted Computing Base (TCB) of the platform. The AVR includes a quote status value provided in an isvEnclaveQuoteStatus field. If the enclave and platform are verified, the quote status is provided as OK, indicating that the EPID signature of the quote was verified, and the TCB level of the platform is current.

The AVR is cryptographically signed by the remote attestation service with a Report Signing Key (e.g., using RSA-SHA256), and a Report Signing Certificate Chain (RSCC) is provided with the AVR. The client verifies the signature over the AVR by decoding and verifying the RSCC, and verifying that the RSCC is rooted in a trusted Attestation Report Signing CA Certificate. The Attestation Report Signing CA Certificate is made available for download to the client after the client registers to the attestation service, which occurs prior to the client initiating the challenge. The client verifies the signature over the AVR using the Attestation Report Signing Certificate (e.g., a public part of a Report Key that is distributed in the form of an x.509 digital certificate).

In response to successful verification, the client derives session keys that are used for subsequent, secure communication with the enclave. The session keys include a signing key (SK), and a master key (MK). The session keys can be referred to as a key pair including a private key and a public key. The session keys are derived using a key derivation key (KDK) that is provided as part of a Diffie-Hellman Key Exchange (DHKE) between the client and the enclave. The shared key obtained from this exchange can be used by the client to encrypt data that is to be provided to the enclave, which is able to derive the same key and use it to decrypt the data. Accordingly, after the attestation is performed, the trust anchor is provided in the shared key provisioned through the key exchange.

In some instances, code executed within the enclave, and/or data within the enclave are dynamic. That is, for example, the enclave program can be capable of running stateful sub-logic code, the state changing over time. An example of this can include, without limitation, sub-logic code (e.g., smart contract code, client code) that uses a specific registration certificate to connect to an external service (e.g., a web-based service). In such a case, each time the enclave program is called, the registration certificate is provided in the request. In addition to carrying the request parameters, the sub-logic code and its state data are also required. After the enclave program loads the sub-logic code and state data, the sub-logic is executed within the enclave and the request parameters are processed to obtain a result. Because the enclave program only has its own static code and static data measured and verified through the original attestation process, the enclave program needs to provide proof to the client that the sub-logic provided the result, and the result is trustworthy.

A traditional approach for proving to the client that the sub-logic provided the result includes providing the complete sub-logic code with each request. For example, when particular sub-logic code is to be executed, the client sends a request to the enclave program that includes the complete sub-logic code and request parameters (e.g., data that is to be processed through the sub-logic code). The enclave program executes the sub-logic code to provide a result. The sub-logic code, or hash value of the sub-logic code, and the result are signed using the private key of the TEE (e.g., also referred to as master key above). When the client receives the returned result from the enclave program for verification, the client uses the original sub-logic code (or recalculates the hash value) to verify the result, and prove that the particular sub-logic code was executed by the enclave program to provide the result.

Such an approach to proving to the client that the sub-logic code provided the result has disadvantages. For example, each time the client sends a request to the enclave program, the complete expression of the sub-logic code needs to be carried in the request, resulting in larger request sizes that burden network transmission. As another example, for processing of each request, the enclave program needs to parse and load the sub-logic code carried in the request, which results in increased processing. As another example, after each request is processed, the enclave program needs to sign the sub-logic code, and the client needs to repeat the check on the sub-logic code provided in the result. Both of these activities result in increased processing. As still another example, due to the complexity, diversity, and incompatibility of different sub-logic codes, it is difficult to directly express the sub-logic code directly in a common format. Therefore, the sub-logic code is coupled in the enclave program query interface, and the scalability is poor.

As used herein, sub-logic code can refer to computer-executable code that is provided for execution by an enclave program after attestation of the enclave program. In some examples, the sub-logic code includes one or more functions that are absent from the enclave program. In this manner, the sub-logic code can be executed by the enclave program to extend functionality of the enclave program.

In view of the above context, implementations of this specification are directed to an efficient and simplified enclave program sub-logic proof scheme. More particularly, and as described in further detail herein, implementations of this specification use the TEE mechanism to convert the proof of the logical expression of the enclave program into a proof based on multiple independent signatures. In further detail, implementations of the present specification divide the enclave program execution sub-logic task into multiple phases. A first phase includes remote verification (attestation). A second phase includes sub-logic code registration. A third phase includes sub-logic querying. As described herein, implementations of this specification reduce network transmission and processing, and achieve higher performance efficiency, and improved scalability.

With regard to the first phase, remote authentication, the client initiates a remote attestation challenge to the enclave program. In response, the enclave program generates a key pair (e.g., public key, private key), which is included in the authentication information that is returned to the client, as described herein. The client sends the authentication information to the remote authentication service (e.g., IAS). The remote authentication service processes the authentication information to provide a verification result (e.g., an AVR), and returns the verification result to the client. After the remote authentication is passed, the client uses the public key of the enclave program to verify responses returned from the enclave program that the enclave program signs using its private key.

Figure 3:
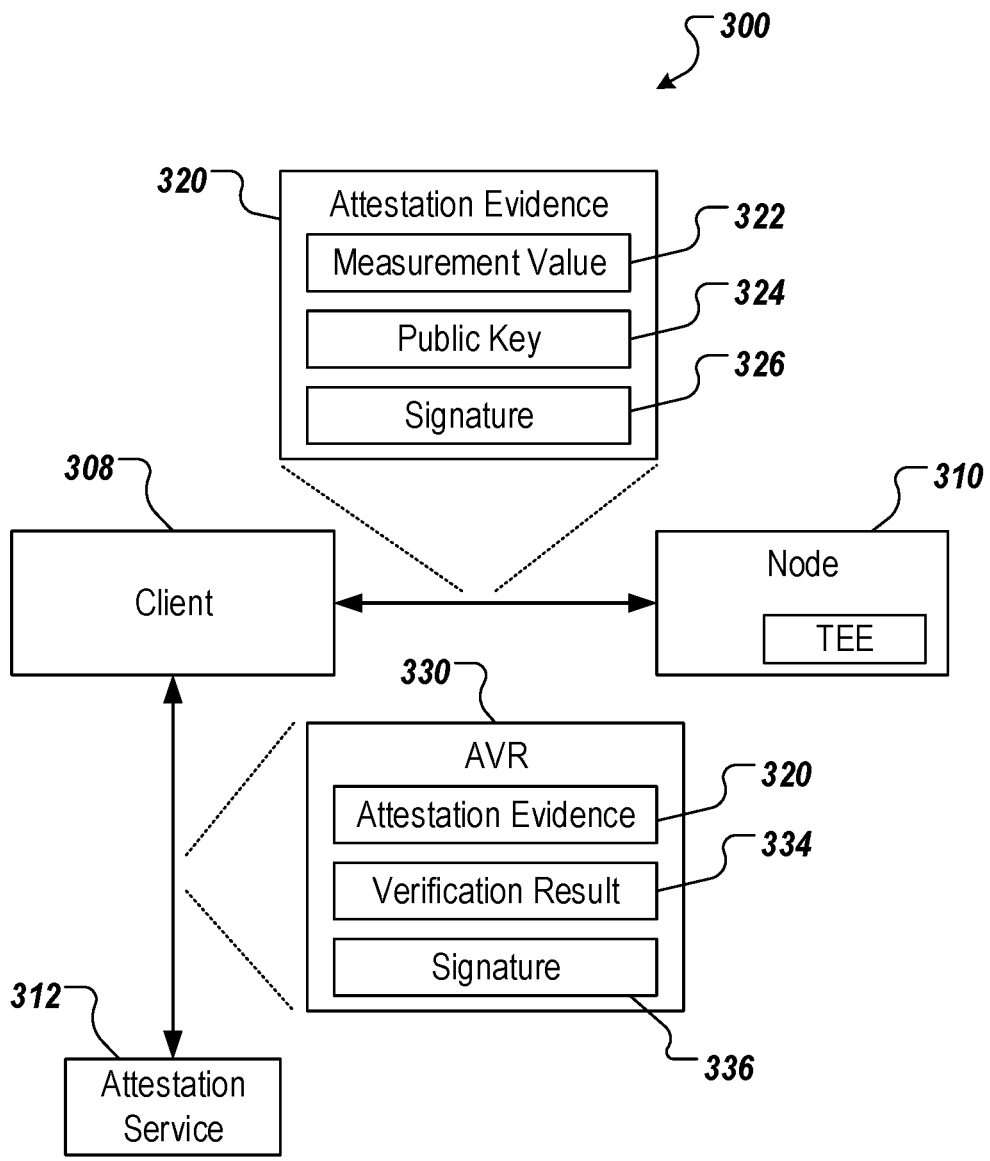
FIG. 3 is a diagram illustrating an example of a system in accordance with implementations of this specification.

FIG. 3 is a diagram illustrating an example of a system 300 in accordance with implementations of this specification. As shown, system 300 includes a client 308, a node 310, and an attestation service 312. In the depicted example, the node 310 is implemented using TEE technology (e.g., Intel SGX). For example, and as described herein, an enclave program executes within the TEE of the node 310. In general, the attestation service 312 verifies a legitimacy of the node 310 for the client 308. An example of an attestation service includes IAS, described above. During the attestation process, the client 308 relays attestation evidence 320 that indicates a legitimacy of the node 310 from the node 310 to the attestation verification service 312. In some implementations, the attestation evidence 320 includes a measurement value 322 of the node 310 and a signature 326 of the node 310. The measurement value 322 of the node 310 may include a hash value based on static code of the enclave program executed within the TEE of the node 310. The signature 326 of the node 310 included in the attestation evidence 320 may include the measurement value 322 of the node 310 that is signed using an attestation key of the node 310.

In some implementations, the attestation key of the node 310 includes an EPID private key. As introduced above, EPID is an algorithm provided by Intel for attestation of a trusted system, while preserving privacy. In general, each of the members (e.g., a computer or a server) of a network is assigned an EPID private key for signing the attestation evidence, and a verifier of the attestation evidence in the network stores an EPID public key that is paired with the EPID private keys of the other members of the network. Each of the members can generate a signature of the attestation evidence using its own EPID private key, and the verifier can verify the signatures of the other members using the EPID public key. As such, the EPID keys can be used to prove that a device, such as a computer or a server, is a genuine device.

The attestation evidence 320 may further include a public key 324 that is generated by the node 310. If the attestation evidence 320 includes the public key 324 that is generated by the node 310, the signature 326 of the node 310 includes the measurement value 322, and the public key 324 that are signed using the attestation key of the node 310.

The node 310 includes any suitable server, computer, module, or computing element to ingest and fulfill requests from the client 308. For example, and in accordance with implementations of the present disclosure, the node 310 may receive and handle requests from clients, such as the client 308, to process sub-logic code and provide respective results. Before handling requests from the client 308, the client 308 challenges the node 310. In response, the node 310 generates the attestation evidence 320, and sends the attestation evidence 320 to the client 308, which provides the attestation evidence 320 to the attestation service 312 for verifying a legitimacy of the node 310. In some implementations, the node 310 generates a key pair including a public key 324 and a private key, and includes the public key 324 in the attestation evidence 320. The public key 324 is used for future communication between the client 308 and the node 310, as described herein. For example, the node 310 may use the private key to sign request results, and the client 308 can use the public key 324 to verify the signed request results.

The attestation service 312 includes any suitable server, computer, module, or computing element to verify the legitimacy of the attestation evidence 320 that is forwarded by the client 308 from the node 310. As noted above, the attestation evidence 320 includes the measurement value 322 of the node 310, the signature 326 of the node 310, and (optionally) the public key 324 generated by the node 310. Upon receiving the attestation evidence 320, the attestation service 312 verifies the signature 326 of the node 310 in the attestation evidence 320, and generates an attestation verification report (AVR) 330.

The attestation service 312 verifies the signature 326 in the attestation evidence 320 using an attestation key of the attestation service 312. In some implementations, the attestation key of the attestation service 312 includes an EPID public key that is paired with the EPID private key that the node 310 used to sign the attestation evidence 320. After verifying the signature in the attestation evidence 320, the attestation service 312 generates the AVR 330 to include the attestation evidence 320, a verification result 334 indicating whether the signature 326 in the attestation evidence 320 is valid, and a signature 336 of the attestation service 312.

In some implementations, the AVR 330 includes the attestation evidence 320 excluding the signature 326 of the relay system node 310. For example, the AVR 330 may include the measurement value 322 of the relay system node 310, the public key 324 generated by the relay system node 310, the verification result 334, and the signature 336 of the attestation service 312. In some implementations, the signature 336 of the attestation service 312 includes the attestation evidence 320 and the verification result 334 that are signed using a report signing key (e.g., a private key that the attestation service 312 uses to sign the attestation verification report) of the attestation service 312. Note that the report signing key can be different from the attestation key of the attestation service 312.

Figure 4:
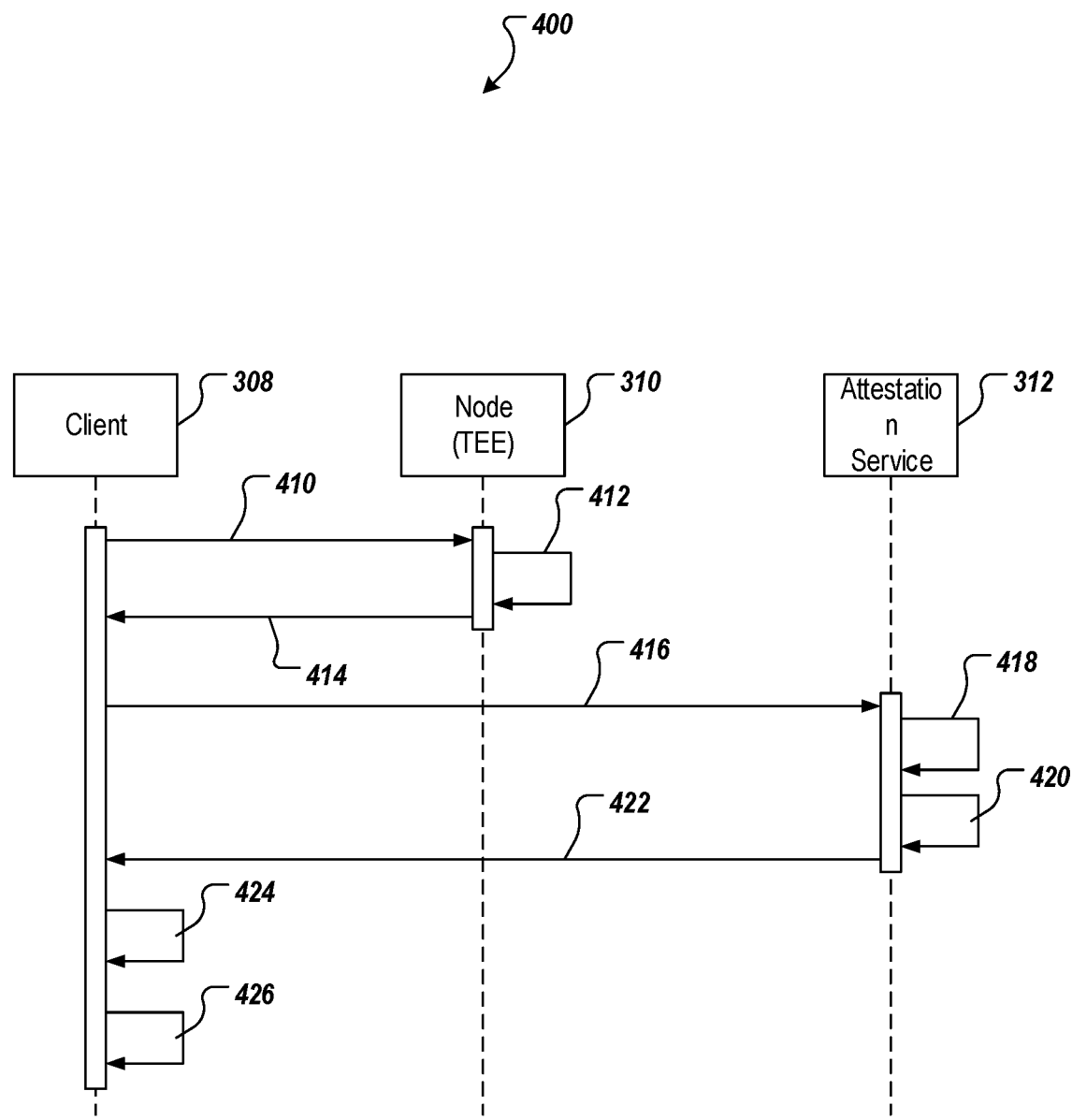
FIG. 4 depicts an example of a signal flow in accordance with implementations of this specification.

FIG. 4 depicts an example of a signal flow 400 in accordance with implementations of this specification. The signal flow 400 represents an attestation verification process. For convenience, the process will be described as being performed by a system of one or more computers, located in one or more locations, and programmed appropriately in accordance with this specification. For example, a distributed system (e.g., the blockchain system 100 of FIG. 1; the system 300 of FIG. 3), appropriately programmed, can perform the process.

Generally, in operation, the client 308 receives attestation evidence from the node 310, and sends the attestation evidence to the attestation service 312 to verify the attestation evidence. The client 308 receives an AVR from the attestation service 312 that indicates a legitimacy of the node 310 based on a verification on a signature of the node 310 in the attestation evidence.

In the example of FIG. 4, the client 308 sends (410) an attestation request (e.g., a challenge) to the node 310. The attestation request is sent to the node 310 to request attestation evidence that indicates a legitimacy or validity of the node 310, and an enclave program executing in a TEE of the node 310. In some implementations, the attestation evidence includes a measurement value of the node 310 and enclave program, and a signature of the node 310. The measurement value of the node 310 may include a hash value of an initial state of the node 310. For example, the measurement value of the node 310 may include a hash value of a process code (enclave program) that is implemented on the node 310.

In response to the attestation request, the node 310 generates (412) attestation evidence. As noted above, the attestation evidence indicates a legitimacy or validity of the node 310, and can include a measurement value of the node 310 and the enclave program, and a signature of the node 310. In some implementations, the attestation evidence further includes a public key that is generated by the node 310. For example, the node 310 may generate a random cryptographic key pair including a private key and a public key using a predetermined key generation algorithm, for example such as, Rivest-Shamir-Adleman (RSA) algorithm. In some examples, the public key is provided in the attestation evidence and can be used for future communication between the client 308 and the node 310. For example, the node 310 may use the private key to sign a request result and the client 308 can use the public key to verify the signed request result.

In some implementations, the measurement value of the node 310 includes a hash value of an initial state of the node 310. The signature of the node 310 in the attestation evidence includes the measurement value and the public key generated by the node 310 that are signed using an attestation key of the node 310. In some implementations, the attestation key of the node 310 includes an EPID private key. Attestation evidence that is signed using an EPID private key can be verified by a verifier using an EPID public key that is paired with the EPID private key to prove a genuineness of a device that generates the attestation evidence.

The node 310 sends (414) the attestation evidence to the client 308. The client 308 forwards (416) the attestation evidence sent from the node 310 to the attestation service 312. In some implementations, the client 308 sends an attestation verification request to the attestation service 312. The attestation verification request includes the attestation evidence sent from the node 310, and supplemental information, such as, for example, a descriptor that indicates whether the node 310 uses the SGX platform service.

The attestation service 312 verifies (418) the attestation evidence in response to receiving the attestation evidence forwarded by the client 308. As noted, the attestation evidence includes a measurement value of the node 310, a public key that is generated by the node 310, and a signature of the node 310. The attestation service 312 may verify the attestation evidence by verifying the signature of the node 310 in the attestation evidence using an attestation key of the attestation service 312. For example, the attestation service 312 may verify the signature of the node 310 using an EPID public key of the attestation verification server that is paired with an EPID private key the node 310 uses to sign the attestation evidence.

If the attestation service 312 determines that the signature of the node 310 in the attestation evidence is valid, the attestation service 312 may determine that the node 310 is a genuine or legitimate device. If the attestation service 312 determines that the signature of the node 310 in the attestation evidence is invalid, the attestation service 312 may determine that the node 310 is not genuine or is an illegitimate device, and reject any subsequent data and requests from the node 310.

The attestation service 312 generates (420) an AVR based on a verification of the attestation evidence. In some implementations, the AVR can include the attestation evidence of the node 310, an attestation verification result, and a digital signature of the attestation verification service 312. In some implementations, the AVR may include the attestation evidence of the node 310 excluding the signature of the node 310. For example, the AVR may include the measurement value of the node 310, the public key generated by the node 310, the attestation verification result, and the signature of the attestation service 312. The attestation verification result in the AVR indicates whether the signature of the node 310 is valid. For example, the attestation verification result may include a value of "valid," or "OK" that indicates the signature of the node 310 is valid or a value of "invalid" that indicates the signature is invalid.

In some implementations, the signature of the attestation service 312 includes the attestation evidence and the attestation verification result that are signed using a report signing key. The report signing key may be a private key that the attestation service 312 uses to sign the AVR. In some implementations, the report signing key is generated by the attestation servicer 312 using a predetermined key generation algorithm. For example, the report signing key may be generated using the RSA-Secure Hash Algorithm (SHA) 256. Note that the report signing key is different from the attestation key (e.g., EPID public key) that the attestation service 312 uses to verify the attestation evidence.

In some implementations, the attestation service 312 sends (422) the AVR to the relay system controller 308. As noted above, the AVR includes a cryptographically signed report of verification of identity of the node 310, and can include the attestation evidence of the node 310, an attestation verification result, and a digital signature of the attestation service 312. The client 308 verifies (424) the AVR. For example, the client 308 may verify the signature of the attestation service 312 in the AVR. In some implementations, the client 308 verifies the signature of the attestation service 312 using a report signing certificate. The report signing certificate may be an X.509 digital certificate. The report signing certificate may include a public key that is generated by the attestation service 312 and that is paired with the report signing key the attestation service 312 uses to sign the AVR.

If the client 308 verifies that the signature of the attestation service 312 in the AVR is valid, the client 308 determines that the AVR is indeed sent by the attestation service 312. If the client 308 determines that the signature of the attestation service 312 in the AVR is invalid, the client 308 determines that the attestation verification report is not genuine, and will reject the AVR. The client 308 may further inspect the attestation verification result in the AVR to determine whether the attestation evidence of the node 310 is valid. In some implementations, the client 308 compares the measurement value in the attestation evidence with a measurement value that is stored by the client 308 to determine whether the attestation evidence is valid.

The client 308 registers (426) the node 310 as a valid or legitimate device in response to determining that the AVR is genuine and that the attestation evidence of the node 310 is valid. The client 308 also stores the public key that is included in the attestation evidence and that is generated by the node 310. The public key will be used by the client 308 for future communication between the client 308 and the node 310, as described herein.

With regard to the second phase, sub-logic code registration, and in accordance with implementations of this specification, the client 308 registers sub-logic code with the node 310 for execution. In some examples, sub-logic code is computer-executable code that can be executed by the enclave program within the node 310. The sub-logic code can be described as a module that extends the functionality of the enclave program. In some implementations, the client 308 registers multiple sub-logic codes with the node 310. In some examples, each sub-logic code can include one or more versions (e.g., v1, v1.1, v2).

In accordance with implementations of the present disclosure, registration of the sub-logic code includes the client 308 transmitting a registration request to the enclave program, and the enclave program providing a registration result. In some examples, for each sub-logic code that is to be registered, the registration request includes an identifier that uniquely identifies the sub-logic code, and the sub-logic code itself. In some examples, for each sub-logic code that is to be registered, the registration request includes the identifier that uniquely identifies the sub-logic code, a version number, and the sub-logic code itself. In some examples, a registration request can be sent for each sub-logic code (e.g., a single registration request for a single sub-logic code). In some examples, a registration request can be sent for multiple sub-logic codes (e.g., a single registration request for two or more sub-logic codes).

In some implementations, in response to receiving the registration request, the enclave program stores the sub-logic code, and provides an index relating the stored sub-logic code to respective identifiers. In some implementations, for each sub-logic code, the enclave program generates a code key pair including a private code key, and a public code key. In this manner, each sub-logic code has a respective code key pair. In some examples, the enclave program generates the code key pair using a key derivation function (KDF) based on the KDK, described above.

In some examples, a single code key pair is provided for multiple versions of the same sub-logic code. For example, if sub-logic code includes a first version and a second version, the same code key pair accounts for both the first version and the second version of the sub-logic code. In some examples, code key pairs are provided for each version of the same sub-logic code. For example, if sub-logic code includes a first version and a second version, a first code key pair is provided for the first version and a second code key pair is provided for the second version.

In some implementations, after the sub-logic code is registered and stored by the enclave program, the enclave program provides a registration result to the client 308. In some examples, the registration result includes a registration indicator (e.g., indicating successful registration of the sub-logic code), the public code key(s) of the sub-logic code, and a digital signature. In some examples, the enclave program generates the digital signature using its private key, which was provided as part of the attestation process described above. For example, the registration indicator and/or the public code key are processed through a hash function to provide a first hash value. An example of a hash function includes, without limitation, SHA-256. The enclave program generates the digital signature based on the first hash value and the private key. For example, the first hash value and the private key are processed through a signature algorithm, which provides the digital signature.

In some implementations, the client 308 receives the registration result, and verifies the registration result using the public key of the enclave program, which was provided as part of the attestation process described above. For example, the client 308 processes the registration indicator and/or the public code key through the hash function to provide a second hash value, and determines the first hash value from the digital signature using the public key of the enclave program. The client 308 compares the first hash value and the second hash value. If the first hash value and the second hash value are the same, the registration result is valid, and the client 308 stores the public code key. If the first hash value and the second hash value are not the same, the registration result is invalid.

Figure 5:
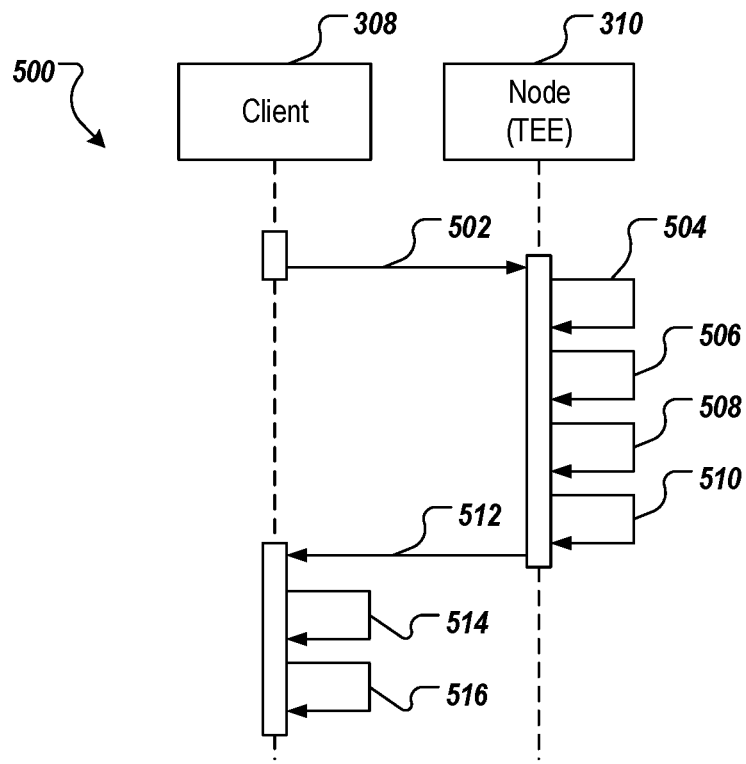
FIG. 5 depicts an example of a signal flow in accordance with implementations of this specification.

FIG. 5 depicts an example of a signal flow 500 during the sub-logic registration phase. The signal flow 500 represents sub-logic registration process. For convenience, the process will be described as being performed by a system of one or more computers, located in one or more locations, and programmed appropriately in accordance with this specification. For example, a distributed system (e.g., the blockchain system 100 of FIG. 1; the system 300 of FIG. 3), appropriately programmed, can perform the process.

In the example of FIG. 5, the client 308 sends (502) a registration request to the enclave program executing within the node 310. In some examples, for each sub-logic code that is to be registered, the registration request includes an identifier that uniquely identifies the sub-logic code, and the sub-logic code itself. In some examples, for each sub-logic code that is to be registered, the registration request includes the identifier that uniquely identifies the sub-logic code, a version number, and the sub-logic code itself.

In some implementations, in response to receiving the registration request, the enclave program stores (504) the sub-logic code, and provides (506) an index relating the stored sub-logic code to a respective identifier. The enclave program generates (508) a code key pair including a private code key, and a public code key for the stored sub-logic code. The enclave program creates (510) a registration result. In some examples, the registration result includes a registration indicator (e.g., indicating successful registration of the sub-logic code), the public code key(s) of the sub-logic code, and a digital signature. The digital signature is generated based on the private key of the enclave program, which was generated during the attestation process. The enclave program 310 sends (512) the registration result to the client 308. In some implementations, the client 308 receives the registration result, and verifies (514) the registration result using the public key of the enclave program, as described herein. If the registration result is valid, the client 308 stores (516) the public code key.

With regard to the third phase, sub-logic querying, and in accordance with implementations of this specification, the client 308 sends a request to the enclave program executing within the node 310 to invoke particular sub-logic code to provide a result. In some implementations, the request includes an identifier of the sub-logic that is to be executed, and one or more request parameters. In some implementations, the request includes the identifier of the sub-logic that is to be executed, a version of the sub-logic code that is to be executed, and the one or more request parameters. In some examples, the one or more request parameters include data that is to be processed using the sub-logic code to provide the result.

In response to receiving the request, the enclave program retrieves the requested sub-logic code (and version, if included in the request), and executes the sub-logic code to provide the result. For example, the enclave program processes the one or more request parameters through the sub-logic code. In some examples, the result is generated based on processing the request parameters through the sub-logic code, and one or more functions of the enclave program. In some examples, the enclave program processes the one or more request parameters and additional data through the sub-logic code. Example additional data can include data that is provided from the enclave program (e.g., data stored in the node 310).

The enclave program provides a response that includes the result and a digital signature. In some examples, the enclave program generates the digital signature using the private code key of the sub-logic code, which was provided as part of the registration process described above. For example, the result is processed through a hash function to provide a first hash value. An example of a hash function includes, without limitation, SHA-256. The enclave program generates the digital signature based on the first hash value and the private code key of the sub-logic code. For example, the first hash value and the private code key are processed through a signature algorithm, which provides the digital signature.

In some implementations, the client 308 receives the response, and verifies the result using the public code key of the sub-logic code, which was provided as part of the registration process described above. For example, the client 308 processes the result through the hash function to provide a second hash value, and determines the first hash value from the digital signature using the public code key of the sub-logic code. The client 308 compares the first hash value and the second hash value. If the first hash value and the second hash value are the same, the result is valid, and the client 308 can perform further operations based on the result. If the first hash value and the second hash value are not the same, the result is invalid.

Figure 6:
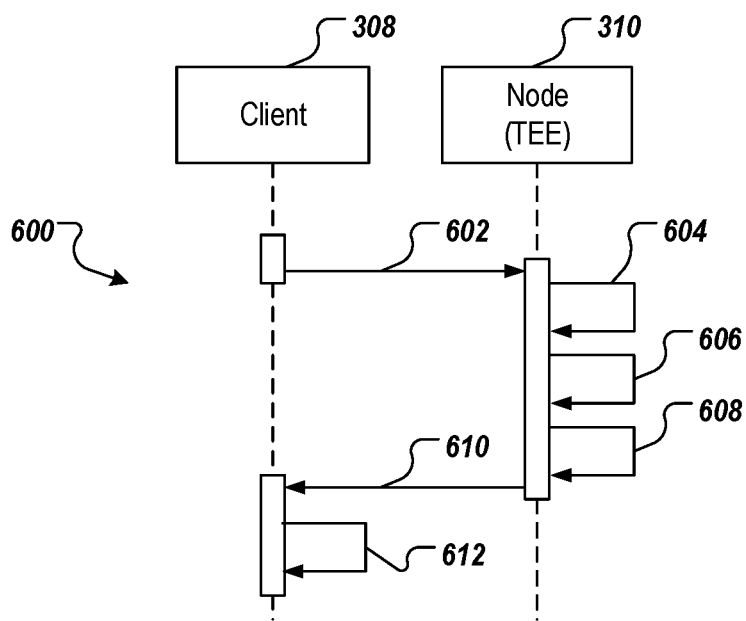
FIG. 6 depicts an example of a signal flow in accordance with implementations of this specification.

FIG. 6 depicts an example of a signal flow 600 during the sub-logic querying phase. The signal flow 600 represents sub-logic querying process. For convenience, the process will be described as being performed by a system of one or more computers, located in one or more locations, and programmed appropriately in accordance with this specification. For example, a distributed system (e.g., the blockchain system 100 of FIG. 1; the system 300 of FIG. 3), appropriately programmed, can perform the process.

In the example of FIG. 6, the client 308 sends (602) a request to the enclave program executing within the node 310 to invoke particular sub-logic code to provide a result. In some implementations, the request includes an identifier of the sub-logic that is to be executed, and one or more request parameters. In response to receiving the request, the enclave program retrieves (604) the requested sub-logic code (and version, if included in the request), and executes (606) the sub-logic code to provide the result. The enclave program provides (608) a response that includes the result and a digital signature using the private code key of the sub-logic code. The enclave program sends (610) the response to the client 308. The client 308 receives the response, and verifies (612) the result using the public code key of the sub-logic code.

Figure 7A:
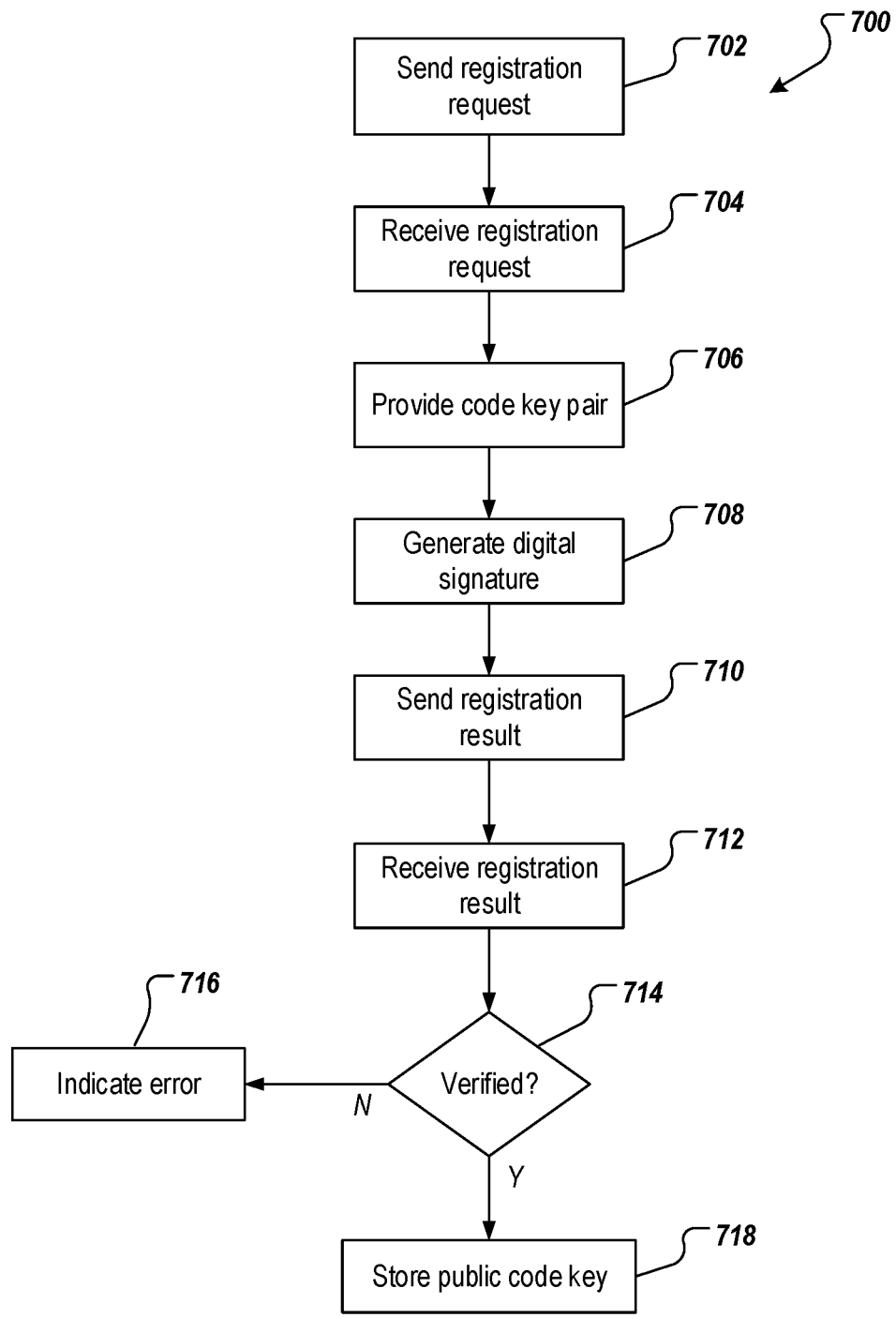
FIGS. 7A and 7B depict examples of processes that can be executed in accordance with implementations of this specification.

FIG. 7A depicts an example of a process 700 that can be executed in accordance with implementations of this specification. In some implementations, the example process 700 may be performed using one or more computer-executable programs executed using one or more computing devices. In some examples, the example process 700 can be performed by a client and a node executing a TEE to register sub-logic for execution within the TEE.

A registration request is sent (702). For example, the client 308 sends a registration request to the enclave program executing within the node 310. In some examples, for each sub-logic code that is to be registered, the registration request includes an identifier that uniquely identifies the sub-logic code, and the sub-logic code itself (e.g., computer-executable instructions). The registration request is received (704). For example, the registration request is received by the enclave program within the node 310. In some examples, the enclave program parses the request to determine the identifier and the sub-logic code.

A code key pair is provided (706). For example, the enclave program stores the sub-logic code, and provides an index relating the stored sub-logic code to a respective identifier. The enclave program generates the code key pair including a private code key, and a public code key for the stored sub-logic code. A digital signature is generated (708). For example, the enclave program generates the digital signature using the private key of the enclave program, which was generated during the attestation process. As described herein, the digital signature is provided based on the public code key of the sub-logic code, and the private key of the enclave program.

A registration result is sent (710). For example, the enclave program sends the registration result to the client 308. In some examples, the registration result includes the public code key of the sub-logic code, and the digital signature. The registration result is received (712). For example, the client 308 receives the registration results. It is determined whether the registration result is verified (714). For example, the client 308 uses the public key of the enclave program to perform a hash value comparison, as described herein. If the registration result is not verified, and error is indicated (716). If the registration result is verified, the public code key is stored (718). For example, the client 308 stores the public code key of the sub-logic code, and indexes the public code key with the identifier of the sub-logic code.

Figure 7B:
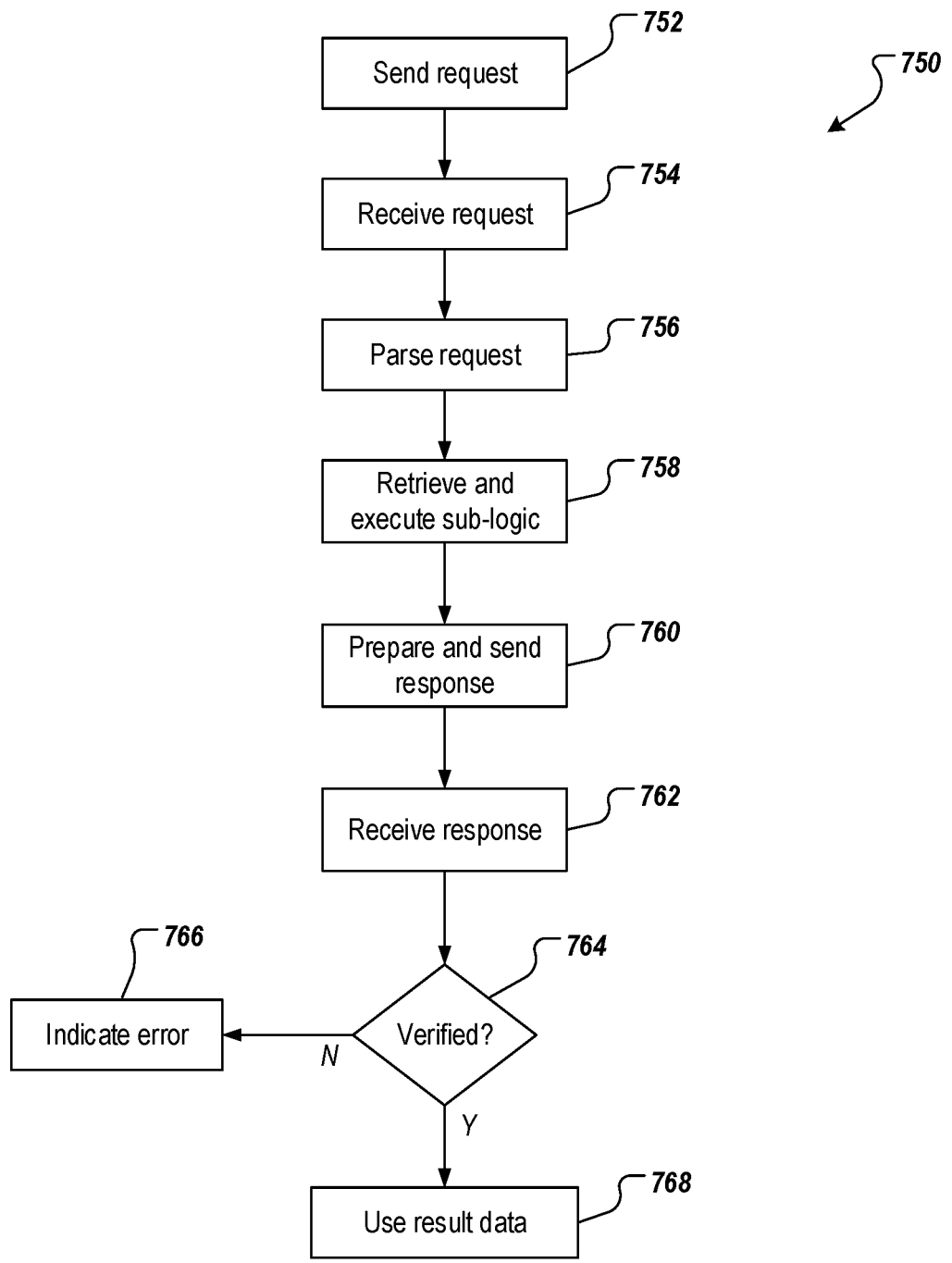

FIG. 7B depicts an example of a process 750 that can be executed in accordance with implementations of this specification. In some implementations, the example process 750 may be performed using one or more computer-executable programs executed using one or more computing devices. In some examples, the example process 750 can be performed by a client and a node executing a TEE to execute sub-logic within the TEE, and provide a program execution and data proof for the sub-logic execution.

A request is sent (752). For example, the client 308 sends a request to the enclave program executing within the node 310 to invoke particular sub-logic code to provide a result. In some implementations, the request includes an identifier of the sub-logic that is to be executed, and one or more request parameters. The request is received (754). For example, the request is received by the enclave program within the node 310. The request is parsed (756). For example, the enclave program parses the request to determine the identifier and the one or more request parameters.

The sub-logic code is retrieved and executed (758). For example, the enclave program retrieves the requested sub-logic code (and version, if included in the request) based on the identifier from computer-readable memory. The enclave program executes the sub-logic code to process the one or more request parameters to provide result data. A response is prepared and sent (760). For example, the enclave program provides a response that includes the result and a digital signature using the private code key of the sub-logic code. The enclave program sends the response to the client 308.

The response is received (762). For example, the client 308 receives the response. It is determined whether the response is verified (764). For example, the client 308 uses the public code key of the sub-logic code to perform a hash value comparison, as described herein. If the response is not verified, an error is indicated (766), and the result data is not used by the client 308. If the response is verified, the result data is used (768). For example, the client 308 uses the result data for further processing.

Figure 8:
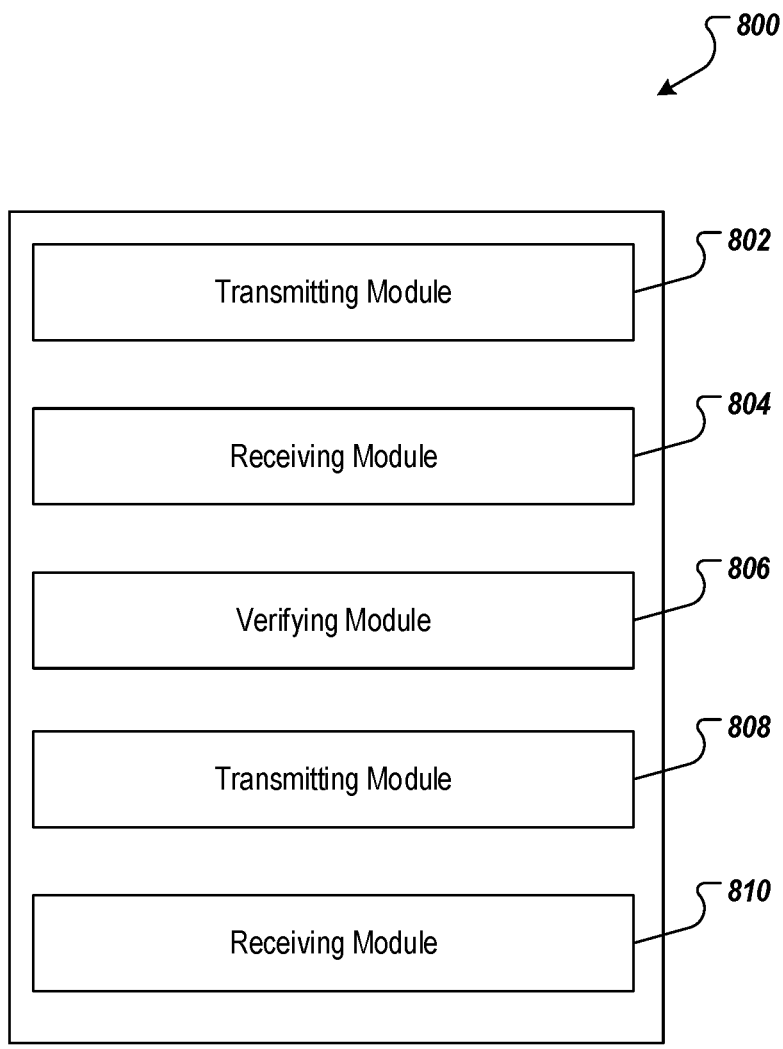
FIG. 8 depicts examples of modules of an apparatus in accordance with implementations of this specification.

FIG. 8 depicts examples of modules of an apparatus 800 in accordance with implementations of this specification. The apparatus 800 can be an example implementation of a client, such as the client 308 of FIG. 3 for calling sub-logic code to be executed within a TEE, and registering of the sub-logic code within the TEE. The apparatus 800 can correspond to the implementations described above, and the apparatus 800 includes:

A transmitting module 802 transmits a request to a node. For example, and as described herein, the node executes a trusted program within a TEE. In some examples, the request includes an identifier and one or more request parameters, the identifier identifying sub-logic code. A receiving module 804 that receives a response to the request. For example, and as described herein, the response includes result data, and a digital signature, the result data being generated by processing of the one or more request parameters using the sub-logic code within the TEE. The digital signature is generated using a private code key of the sub-logic code. A verifying module 806 verifies the result data using the digital signature, and a public code key of the sub-logic code. A transmitting module 808 that transmits a registration request to register the sub-logic code with the trusted program within the TEE. In some examples, the registration request includes the identifier and the sub-logic code. A receiving module 810 receives a registration result from the trusted program. In some examples, the registration result includes the public code key of the sub-logic code.

In general, innovative aspects of the subject matter described in this specification can be embodied in actions of transmitting, by a client device, a request to a node, the node executing a trusted program within a TEE, the request including an identifier and one or more request parameters, the identifier identifying sub-logic code, receiving, by the client device, a response to the request, the response including result data, and a digital signature, the result data being generated by processing of the one or more request parameters using the sub-logic code within the TEE, and the digital signature being generated using a private code key of the sub-logic code, and verifying, by the client device, the result data using the digital signature, and a public code key of the sub-logic code. Other implementations of this aspect include corresponding computer systems, apparatus, and computer programs recorded on one or more computer storage devices, each configured to perform the actions of the methods.

The foregoing and other implementations can each optionally include one or more of the following features, alone or in combination: actions further include transmitting, by the client device, a registration request to register the sub-logic code with the trusted program within the TEE, the registration request including the identifier and the sub-logic code, and receiving, by the client device, a registration result from the trusted program, the registration result including the public code key of the sub-logic code; actions further include verifying the registration result using a digital signature of the trusted program and a public key of the trusted program, the digital signature of the trusted program being generated using a private key of the trusted program, the public key and the private key of the trusted program being generated as a key pair during an attestation of the trusted application; the sub-logic is retrieved from computer-readable memory based on the identifier, and is executed within the TEE to generate the result; the sub-logic code is one of a plurality of sub-logic code stored in the node; the public code key and the private code key are generated as a code key pair during registration of the sub-logic code with the TEE; the request further includes a version number indicating a version of the sub-logic code that is to be executed to provide the result; the client device includes a node within a blockchain network.

As described herein, implementations of this specification achieve one or more technical effects over traditional systems. In some implementations, only the identifier of the sub-logic code that is to be executed is sent in the request from the client, instead of the sub-logic code itself. This significantly reduces the size of the request, which conserves computing resources (e.g., processors, memory, network bandwidth), and alleviates network bottlenecks. In some implementations, in response to receiving the request, the enclave program need not parse and load the sub-logic code carried in the request, avoiding increased processing. In some implementations, after each request is processed, the enclave program only signs the result, and not the entire sub-logic code, and the client only checks the signed result. Both of these activities result in reduced processing relative to traditional approaches. In some implementations, scalability of use of sub-logic code is improved, and variations of the sub-logic code (e.g., versions) is supported.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a standalone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, the method comprising:
    transmitting, by a client device, a request to a node, the node executing a trusted program within a trusted execution environment (TEE), the request comprising an identifier and one or more request parameters, the identifier identifying a sub-logic code, the sub-logic code comprising computer-executable code for execution by the trusted program, wherein the sub-logic code is one of a plurality of sub-logic codes stored in the node, and wherein each sub-logic code of the plurality of sub-logic codes is associated with a respective code key pair comprising a private code key and a public code key;
    receiving, by the client device, a response to the request, the response comprising result data and a digital signature of the sub-logic code, the result data being generated by processing of the one or more request parameters using the sub-logic code within the TEE, and the digital signature of the sub-logic code being generated using a first private code key of the sub-logic code; and
    verifying, by the client device, the result data using the digital signature of the sub-logic code and a first public code key of the sub-logic code that is paired with the first private code key.

2. The method of claim 1, further comprising:
    transmitting, by the client device, a registration request to register the sub-logic code with the trusted program within the TEE, the registration request comprising the identifier and the sub-logic code; and
    receiving, by the client device, a registration result from the trusted program, the registration result comprising the first public code key of the sub-logic code.

3. The method of claim 2, further comprising:
    verifying the registration result using a digital signature of the trusted program and a public key of the trusted program, the digital signature of the trusted program being generated using a private key of the trusted program, the public key and the private key of the trusted program being generated as a key pair during an attestation of the trusted program.

4. The method of claim 1, wherein the sub-logic code is retrieved from computer-readable memory based on the identifier, and is executed within the TEE to generate the result data.

5. The method of claim 1, wherein the first public code key and the first private code key are generated as a code key pair during registration of the sub-logic code within the TEE.

6. The method of claim 1, wherein the request further comprises a version number indicating a version of the sub-logic code that is to be executed to provide the result data.

7. The method of claim 1, wherein the client device comprises a client node within a blockchain network.

8. A non-transitory, computer-readable storage medium storing one or more instructions executable by a computer system to perform operations comprising:
    transmitting a request to a node, the node executing a trusted program within a trusted execution environment (TEE), the request comprising an identifier and one or more request parameters, the identifier identifying a sub-logic code, the sub-logic code comprising computer-executable code for execution by the trusted program, wherein the sub-logic code is one of a plurality of sub-logic codes stored in the node, and wherein each sub-logic code of the plurality of sub-logic codes is associated with a respective code key pair comprising a private code key and a public code key;
    receiving a response to the request, the response comprising result data and a digital signature of the sub-logic code, the result data being generated by processing of the one or more request parameters using the sub-logic code within the TEE, and the digital signature of the sub-logic code being generated using a first private code key of the sub-logic code; and
    verifying the result data using the digital signature of the sub-logic code and a first public code key of the sub-logic code that is paired with the first private code key.

9. The non-transitory, computer-readable storage medium of claim 8, wherein the operations further comprise:
    transmitting a registration request to register the sub-logic code with the trusted program within the TEE, the registration request comprising the identifier and the sub-logic code; and
    receiving a registration result from the trusted program, the registration result comprising the first public code key of the sub-logic code.

10. The non-transitory, computer-readable storage medium of claim 9, wherein the operations further comprise:
    verifying the registration result using a digital signature of the trusted program and a public key of the trusted program, the digital signature of the trusted program being generated using a private key of the trusted program, the public key and the private key of the trusted program being generated as a key pair during an attestation of the trusted program.

11. The non-transitory, computer-readable storage medium of claim 8, wherein the sub-logic code is retrieved from computer-readable memory based on the identifier, and is executed within the TEE to generate the result data.

12. The non-transitory, computer-readable storage medium of claim 8, wherein the first public code key and the first private code key are generated as a code key pair during registration of the sub-logic code within the TEE.

13. The non-transitory, computer-readable storage medium of claim 8, wherein the request further comprises a version number indicating a version of the sub-logic code that is to be executed to provide the result data.

14. The non-transitory, computer-readable storage medium of claim 8, wherein the operations are performed by a client node within a blockchain network.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
transmitting a request to a node, the node executing a trusted program within a trusted execution environment (TEE), the request comprising an identifier and one or more request parameters, the identifier identifying a sub-logic code, the sub-logic code comprising computer-executable code for execution by the trusted program, wherein the sub-logic code is one of a plurality of sub-logic codes stored in the node, and wherein each sub-logic code of the plurality of sub-logic codes is associated with a respective code key pair comprising a private code key and a public code key;
receiving a response to the request, the response comprising result data and a digital signature of the sub-logic code, the result data being generated by processing of the one or more request parameters using the sub-logic code within the TEE, and the digital signature of the sub-logic code being generated using a first private code key of the sub-logic code; and
verifying the result data using the digital signature of the sub-logic code and a first public code key of the sub-logic code that is paired with the first private code key.

16. The computer-implemented system of claim 15, wherein the operations further comprise:
transmitting a registration request to register the sub-logic code with the trusted program within the TEE, the registration request comprising the identifier and the sub-logic code; and
receiving a registration result from the trusted program, the registration result comprising the first public code key of the sub-logic code.

17. The computer-implemented system of claim 16, wherein the operations further comprise:
verifying the registration result using a digital signature of the trusted program and a public key of the trusted program, the digital signature of the trusted program being generated using a private key of the trusted program, the public key and the private key of the trusted program being generated as a key pair during an attestation of the trusted program.

18. The computer-implemented system of claim 15, wherein the sub-logic code is retrieved from computer-readable memory based on the identifier, and is executed within the TEE to generate the result data.

* * * * *